Dec. 9, 1952  H. C. WENDT  2,621,314
TRANSMISSION SYSTEM
Filed Nov. 7, 1950  2 SHEETS—SHEET 1
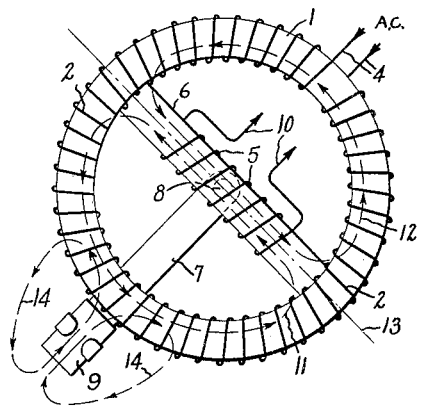
Fig. 1.
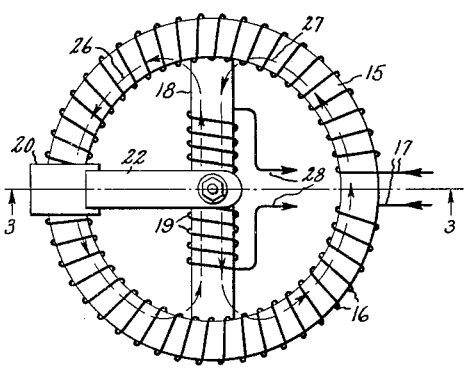
Fig. 2.
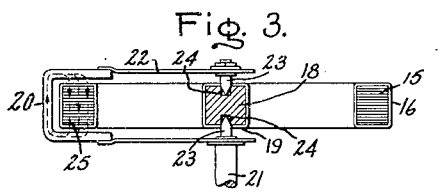
Fig. 3.
Fig. 4.
Inventor:
Harry C. Wendt,
by Russell A. Warner
His Attorney.

Dec. 9, 1952 H. C. WENDT 2,621,314
TRANSMISSION SYSTEM
Filed Nov. 7, 1950 2 SHEETS—SHEET 2

Inventor:
Harry C. Wendt,
by Russell A. Warner
His Attorney.

Patented Dec. 9, 1952

2,621,314

UNITED STATES PATENT OFFICE 2,621,314

TRANSMISSION SYSTEM

Harry C. Wendt, Nahant, Mass., assignor to General Electric Company, a corporation of New York Application November 7, 1950, Serial No. 194,441

14 Claims. (Cl. 318—25)

1

The present invention relates to data transmission systems, and, more particularly, to arrangements wherein the orientations of movable members are characterized by electrical and mechanical signals.

It has long been appreciated that remote indication and control may be accomplished by saturable core second harmonic apparatus including a transmitter and remote receiver or detector which are electrically interconnected and each of which includes a stator having a core of magnetically permeable material and a winding or windings thereon, the transmitter and receiver units having a rotor comprising a poled magnet disposed with its poles in proximity with the core and windings. In such systems as the foregoing, the transmission of intelligence between units is achieved by means of electrical signals having a frequency which is an even harmonic of the frequency of the excitation signals applied to the system. Optimum operation in many circuits which utilize these even harmonic signals cannot be secured without the addition of power supplies, amplifiers, and filter networks designed for these frequencies. Additionally, it is obviously desirable to retain the advantages which accompany the use of a transmitter rotor which requires no windings thereon and eliminates the need for brushes, slip rings, or spirals. Therefore, in accordance with the teachings of the present invention, the transmission of intelligence in a novel and improved system which accomplished remote indication or control is achieved by means of electrical signals having the same fundamental frequency as the excitation signals applied to the system, and by means of transmitter units which require no electrical connections to the movable elements thereof.

Accordingly, it is one object of this invention to provide a novel and improved system which utilizes electrical signals of the same frequency as the system supply signals to perform control operations and to reproduce motions at a remote position.

A second object is to provide a novel electrical signal transmitting device in which electrical connections are not made to any portion of the movable structure thereof.

Additionally, an object is to provide an electromagnetic signal transmitting device having a stator and rotor structure and wherein fundamental frequency electrical signals are characterized by the orientations of the transmitter rotor which varies the reluctance of one portion of the stator flux path.

2

These and further objects and features of this invention may be most effectively observed with reference to the following description and the accompanying drawings, wherein:

Figure 1 is a plan view of one embodiment of an electrical signal transmitter and detector arrangement constructed in accordance with the subject invention;

Figures 2 and 3 are, respectively, a plan view and a cross-sectional side view of a second preferred embodiment of an electrical pick-off;

Figure 4 depicts an electrical signal transmitter and remote detector arrangement;

Figure 5:
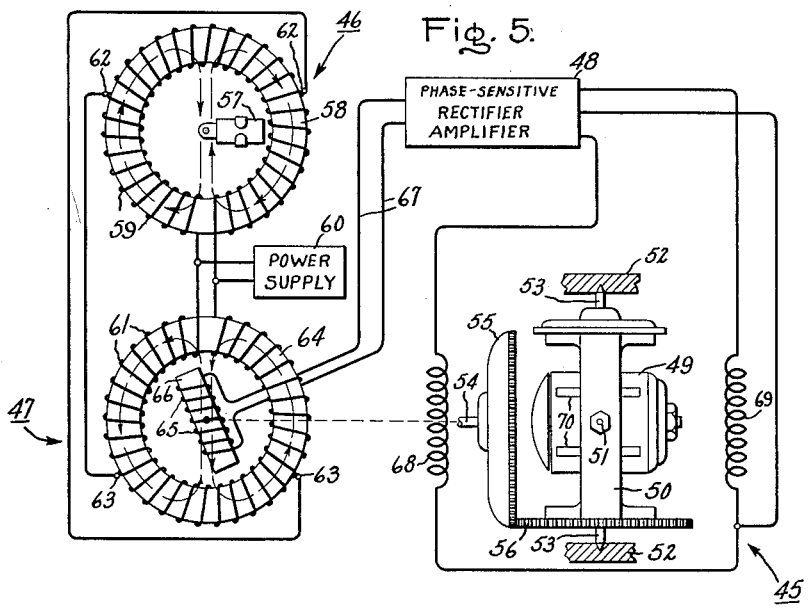
Figure 5 illustrates a compass-controlled directional gyroscope system incorporating the signal transmitter and remote detector arrangements of this invention.

The electrical signal transmitter and detector arrangement of Figure 1 includes an annular flux-conducting core 1, a toroidal coil 2 wound thereon and insulated from the core and excited from A. C. supply leads 4, a detector coil 5 positioned diametrically with respect to core 1 on a support 6 which is fixed in relationship to the core 1, a bracket 7 supported by a shaft 8 independent of the core and coil structures, and a permanent magnet 9 carried by bracket 7 such that its longitudinal axis is substantially radial to the core 1. Output voltages appear across the output leads 10 of the detector coil 5 and, as will be more fully explained hereinafter, characterize the relative angular orientations of the magnet 9 and core 1 by their phase and magnitude. The simple combination of core 1 and the toroidal coil 2 thereon excited from an A. C. source, or a pulsating D. C. source, ordinarily would produce no effective flux in either direction across any diameter of the combination. Thus, an output coil such as the diametric detector coil 5 would, in such a system, produce no output signal, regardless of the diametric position thereof. This is explained by the fact that the fluxes traversing the annular core parallel to any diameter are equal and opposite. In Figure 1, for example, if the effects of the magnet are momentarily neglected, the instantaneous fluxes 11 and 12 produced in each half of core 1 by coil 2, traverse the diameter 13, but are of equal amplitude and in opposite diametric directions, and thus produce no effective output voltage across the detector coil output leads. When the permanent magnet 9 is disposed in proximity with only one portion of the core 1, however, the flux conducting material of the core at this portion is so influenced by the magnetization produced by the magnet that the reluctance of the half of the core in which said portion is located is effectively increased, and the flux through this half of the core and traversing the core diameter is smaller than that other flux in the opposite half, such that an effective diametric flux having phase coincidence with the said other flux is experienced and a corresponding output voltage is induced in the detector coil. With reference to the arrangement in Figure 1, it is found that the flux 14 from permanent magnet 9 causes the portion of core 1 near it to behave magnetically in a manner which evidences a lower permeability than in the remaining portions, that is, the reluctance to the flow of the instantaneous core flux 11 appears to be greater than it is to the flux 12, since, across the diameter 13, the effective flux is substantially that of flux 12 less flux 11. A corresponding effective voltage is produced in the output leads 10 of detector coil 5, and it is apparent that such output voltage bears a phase which is determined by the phase of flux 12, which is the greater of the two diametric fluxes. It should be clear that a 180 degree displacement of the magnet and core from the position illustrated would result in an opposite set of conditions, that flux 11 would be the greater, and that the phase of the output voltage would be reversed such that it would bear a phase determined by the flux 11. Of course, the lines of flux 11 and 12 are not the only significant ones, but merely representative of the many lines of flux which traverse the core diameter and which have the aforesaid characteristics. The orientation of the magnet and detector coil shown in Figure 1 is that at which maximum output voltage of one phase is secured, the maximum voltage of the opposite phase being obtained when the displacement from this position is 180 degrees. At intermediate positions, the magnitude of the output signals is in a predetermined relation with the magnitude of the displacement from the positions of maximum output, becoming zero when the magnet is substantially parallel to the longitudinal axis of the detector coil.

In the foregoing manner, the relative positions of the magnet structure and the core and coil structure are translated into output signals in which such relative positions are characterized by the phase and amplitude thereof with reference to the excitation signals applied to the toroidal coil. These output signals have the same frequency as the toroidal coil excitation voltage. Shaft 8 and the magnet structure carried by it may be rotatable with respect to the core and coil unit, or the latter may be the rotor of the system, depending upon the requirements of the particular installations involved.

Figures 2 and 3 depict a plan and cross-sectional side view, respectively, of another embodiment of a signal transmitter and detector unit. The arrangements and functions of the transmitter core 15, the toroidal coil 16 thereon excited from the A. C. supply leads 17, the diametric mount 18, and the detector coil 19, are substantially the same as those of their counterparts in Figure 1. Permanent magnet 20 is rotatable with the shaft 21 to which it is coupled by supports 22, and alignment of the center of rotation of the magnet and the center of the annular core is further preserved by the pivots 23 affixed to the supports 22 and mating with the bearings 24 in the diametric mount 18. The permanent magnet 20 is substantially U-shaped and creates a flux 25, between the poles at its open ends, which is of relatively high intensity and which is substantially parallel rather than radial to the axis of rotation of the relatively rotatable members. This disposition of the magnet such that its poles are on opposite sides of and equally spaced from one portion of the annular core also reduces the locking torques between the magnet and core which may be experienced when only one pole is adjacent the core. The core fluxes 26 and 27 are caused to have differing magnitudes in the same manner as were the fluxes 11 and 12 of Figure 1, the outputs from detector coil leads 28 varying in accordance with the relative orientations of the annular core and the magnet structure.

Tests on devices having structures corresponding to those of Figures 1, 2 and 3 have confirmed that output signals of the nature specified are realized. Although it is known that the result of magnetization of only one portion of the annular core is to reduce the effective core flux, produced by the core winding, in that half of the core in which the magnetization occurs, thereby evidencing an increase in the reluctance of that half of the core, what specific effect, or combination of effects, is responsible for these results has not been conclusively determined. It has been established by actual demonstration, however, that the desired results obtain regardless of whether the permanent magnet directs its flux through the annular core in two opposite angular directions, as by flux 14 in Figure 1, or in substantially one direction transverse to the direction of the A. C. core flux, as by flux 25 in Figure 3, or in one angular direction substantially parallel to the A. C. core flux, not shown.

In each of the foregoing embodiments, the diametrically-positioned coil has been illustrated as fixed in orientation with respect to the annular core and has functioned as a search or detector coil in a combination detector and transmitter unit. However, many applications of devices of the character of those encompassed by the instant invention require that the detector be remote from the transmitter assembly, and Figure 4 illustrates one such arrangement. The transmitter unit 29 includes an annular core 30, a toroidal coil 31 wound thereon and tapped at a plurality of points, and a rotor structure 32 incorporating a permanent magnet 33 whose flux at any time extends principally to only one portion of the annular core. The receiver or detector unit 34 also includes an annular core 35, and a toroidal coil 36 wound thereon and tapped at the same number of points and at the same angular positions, the corresponding tap points of the transmitter and detector coils being interconnected and the ends of the coils being excited in parallel from a common supply of A. C. or pulsating D. C., 37. When the transmitter rotor magnet assumes any angular position with reference to the core 30, the diametric core fluxes 38 and 39 have a maximum difference along a core diameter as substantially a right angle to the rotor magnet, and, for the condition representing in Figure 4, the instantaneous flux 39 would be the larger. The interconnection between corresponding points of the transmitter and detector unit coils 31 and 36 assures that these pairs of points are at the same potential, that substantially identical currents flow in corresponding portions of the two coils, and that diametric fluxes 40 and 41, substantially the same as fluxes 38 and 39, are caused to flow through core 35 and across a diameter thereof which is angularly aligned with the coil 36 in the same relative position as is the diametric flux of transmitter 29 with its coil 31. The remote detector unit 34 includes a diametrically-positioned detector coil 42, mounted on a support 43, which intercepts the periodically-varying diametric flux in the detector unit and produces output signals across its leads 44. These signals are of a phase and amplitude dependent upon the angular orientation of the diametric flux path with respect to the detector coil, as is true in the case of the units of Figures 1, 2 and 3, and thus the orientations of the transmitter magnet and core are characterized by the remote detector output signals. In systems which require a trim or compensation of the output such that the output signals characterize an angular orientation of the transmitter rotor which is of either a greater or lesser angle than that which actually exists, a trim may be provided by angularly displacing detector coil 42 and its movable support 43 with respect to the receiver core 35, thereby eliminating the need for injecting a separate trim signal into the system from another source.

The fundamental frequency slaved directional gyroscope system portrayed in Figure 5 embodies the inventive concepts herein disclosed, and illustrates a novel transmitter and remote differential detector arrangement which is of particular utility. Included in this system are the conventional elements, a directional gyroscope 45, a remotely positioned magnetic compass transmitter arrangement 46, a differential detector arrangement 47, and a phase-sensitive rectifier-amplifier 48. In the gyroscope 45, a rapidly spinning rotor, not shown, is mounted in the rotor frame 49 which is pivotally supported in the gimbal 50 by means of trunnions 51. Gimbal 50 is, in turn, supported pivotally with respect to the outer frame 52 by trunnions 53, and shaft 54 indicates the angular position of the gyroscope by its own angular orientation which is established by the attached cup gear 55 driven by gear 56 mounted on gimbal 50. The remote magnetic compass transmitter unit 46 is shown to include a permanent magnet 57 pivotally mounted to align itself with the earth's magnetic field and positioned such that it causes magnetization of the transmitter core 58 at only one portion at any time. In practice, the magnet 57 may be counterbalanced to facilitate its orientation with the earth's field, or the magnet structure may comprise one or a pair of permanent magnets of greater length pivoted about a point of symmetry and magnetically shielded from the transmitter core except at the one end which is to magnetize the core. A toroidal coil 59 is wound about the annular core 58, is excited at its ends from the A. C. or pulsating D. C. power source 60, and is coupled polyphase with the coil 61 of the differential detector 47 at its ends and at a plurality of tap points, 62 and 63 of the transmitter and detector respectively. The differential detector coil 61 is also wound upon a flux-conducting annular core, 64, and further comprises a diametrically-extending pick-up or detector coil 65 mounted on a support 66 which is rotatable with respect to the core 64 and which is coupled to rotate with the directional gyro output shaft 54. Output signals from the differential detector pick-up coil 65 are applied to the phase-sensitive rectifier-amplifier 48 through leads 67, and the direct current output signals from the unit 48 are circulated through the torque motor coils 68 and 69 to produce magnetic fields which interact with the fields from permanent magnets 70 attached to the gyro frame 49, thereby applying the required precessing torque to the gyro. The polarity and magnitude of these direct currents depend upon the polarity and magnitude of the alternating current signals applied to the rectifier-amplifier 48 from the differential detector 47. Forms of precessing torque motors other than that shown may, of course, be employed, and may, for example, comprise A. C. torque motors actuated by the detector output after amplification.

When the compass magnet or magnets align themselves with the earth's magnetic field, the transmitter core 58 is more highly magnetized by a D. C. flux at a particular position determined by the orientation of the movable magnet structure, and unbalanced diametric fluxes are established in the manner hereinbefore explained. This diametric flux condition is reproduced in the remote differential detector 47 because of the polyphase interconnection of coils 59 and 61. Detector or pick-up coil 65 is to be positioned, through its support 66 coupled to the gyro output shaft 54, such that no output signals are produced therein, that is, such that the longitudinal axis of coil 65 is at right angles to the maximum unbalanced diametric flux appearing across the detector coil 64. When this condition is realized, no precessing voltages are applied to the gyro torque motor coils 68 and 69, and the gyro and magnetic compass are in correspondence. As represented in Figure 5, however, the coil 65 is not perpendicular to the unbalanced core flux, which is a condition produced by lack of correspondence between the orientations of the gyro and magnetic compass, and the rectifier-amplifier unit 48 would receive signals from the detector coil 65 which are of such polarity that the direct current output from unit 48 would energize the gyro torque motor to precess the gyroscope in azimuth until its output shaft 54 restores the detector coil 65 to the position which is perpendicular to the maximum unbalanced core flux in detector unit 47. It should be appreciated that no second harmonic voltages are of significance in this particular system. Since the differential detector output signals are of the same fundamental frequency as the excitation voltage applied to both the compass transmitter and remote differential detector units, and this may be of the same frequency as the electrical system of the supporting craft, the plates of the tubes of the conventional phase-discriminator portion of the unit 48 may be supplied by this same voltage. Obviously, the foregoing arrangement applies equally well to any system wherein there is a rotatable input member to actuate the transmitter rotor and a rotatable output shaft adapted to actuate the differential detector rotor responsive to movement by a motive device, and the invention is not limited to that of the illustrated embodiment of a slaved directional gyro system.

Figure 6:
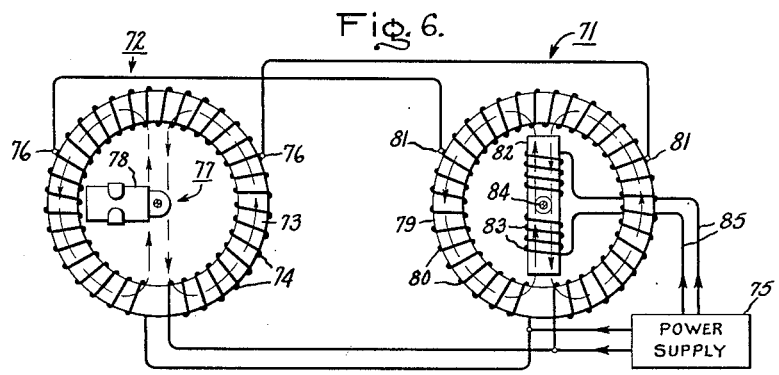
Figure 6 shows a system for the remote reproduction of angular motion employing the inventive concepts herein disclosed.

A fundamental frequency motion reproducing system embodying the concepts of the present invention is disclosed in Figure 6, wherein the receiver 71 is caused to reproduce the rotor-stator orientations of the transmitter 72. The transmitter includes the same elements as those previously listed in connection with the preceding embodiment, namely an annular flux-conducting core 73, a toroidal coil 74 thereon energized from the power supply 75 and tapped at a plurality of points 76, and a rotor structure 77 including a permanent magnet 78 which magnetizes only one portion of the core 73 at any time. Receiver 71 also utilizes an annular core, 79, a toroidal coil 80 wound thereon and excited from power source 75 and tapped at a plurality of points 81 which are connected with the corresponding taps 76 on transmitter coil 74, a rotatable diametric support 82, preferably of flux-conducting material, having a coil 83 wound thereon and actuating an output shaft 84 coupled therewith, and leads 85 conducting excitation to the rotatable coil 83 from power supply 75. The unbalanced diametric fluxes generated at the transmitter are reproduced at the receiver as a result of the polyphase interconnection of the coils 74 and 80, and the instantaneous magnetic fields existing because of the excitation of the receiver diametric coil 83 cause the coil 83 and its support 82 and shaft 84 to align themselves with the direction of the instantaneous maximum unbalanced receiver magnetic flux, as shown in Figure 6. In this manner, each position of the transmitter rotor structure 77 with respect to the transmitter core 73 is repeated by a corresponding angular orientation of the receiver shaft 84 with respect to the reciver core 79.

Figure 7:
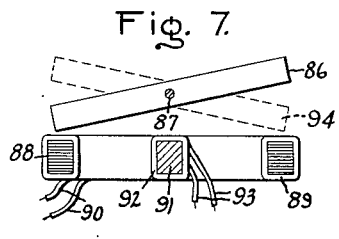
Figure 7 represents an alternative pick-off arrangement responsive to another type of movement of the movable element thereof.

While the foregoing embodiments of this invention have involved transmitter arrangements wherein the magnet element and core and coil structure are relatively rotatable, it should be understood that the arrangements are also responsive to relative movments which are other than rotatable. Essentially, it is only necessary to cause magnetization of the core to a greater or a lesser extent and at only substantially one portion of the core at any time to realize the production of characteristic fundamental frequency output signals or the reproduction of movement at a receiver unit. For example, in Figure 7, the permanent magnet 86 is movable about an axis 87 such that the opposite ends thereof may be moved toward and away from the flux-conducting core 88, shown in cross-section. The toroidal coil 89 is energized from an A. C. or pulsating D. C. source through leads 90, whereupon the resultant diametric flux through support 91 and the diametrically-positioned coil 92 is caused to vary in amplitude with changes in the proximity of the magnet to the core and to vary in phase in accordance with whichever end of the magnet 86 is nearer the core 88. Thus, maximum detector coil output of one phase is produced across leads 93 when magnet 86 is as diagrammed, and the output is maximum and reversed in phase when the magnet is tilted to the position of the dotted outline 94. Polarity of output is not determined by the polarity of the magnet poles, but by whichever half of the transmitter core is magnetized by such poles. Therefore, it should be apparent that, depending upon the requirements of the particular application which is made of the invention, the magnet structure may be moved in any convenient way, or the core structure may be the movable portion of the unit.

Permanent magnet elements for magnetizing portions of the transmitter cores are preferably utilized, although electromagnets may be employed to produce the same results, it being clear also that variations in the D. C. excitation voltage would then be reflected in the output signals and the apparatus would serve as a modulator if desired. The flux-conducting cores in the units are not ordinarily permitted to saturate, whereby the occurrence of second harmonic voltages and fluxes is precluded. However, if a combination second harmonic and fundamental frequency system is required, the excitation voltage for the transmitter toroidal coil may be increased to permit saturation of the core, and the maximum resultant second harmonic flux and the maximum resultant fundamental frequency flux will appear at diametric positions 90 degrees displaced across the core and may be detected at such positions either at the transmitter or in the remote detector or receiver units.

While particular embodiments of the subject invention have been shown and described herein, these are in the nature of description rather than limitation, and it will occur to those skilled in the art that various changes, modifications, and combinations may be made within the province of the appended claims without departing in spirit or scope from this invention in its broader aspects.

What I claim as new and desire to secure by Letters Patent of the United States is:

1. A data transmission system comprising a flux-conducting core having an aperture therethrough, an electrical winding on said core, a source of varying amplitude voltage energizing said winding, magnetic means disposed to direct magnetic flux through said core only at substantially one portion of said core at any time, said core and magnetic means being relatively movable, and means responsive to fluxes established through said core and across said aperture for producing output signals characteristic of the relative orientations of said core and magnetic means.

2. A data transmission system comprising a flux-conducting core having an aperture therethrough, an electrical winding on said core, a source of voltage periodically varying in amplitude and energizing said winding, magnetic means disposed to magnetize said core only at substantially one portion thereof at any time, said core and magnetic means being relatively movable, and means responsive to fluxes through said core and across said aperture, and varying at the same frequency as said source voltage, for producing output signals characteristic of the relative orientations of said core and magnetic means.

3. A data transmission system comprising a substantially annular flux-conducting core, a toroidal electrical winding on said core, a source of voltage energizing said winding and having periodic variations in amplitude, means producing a unidirectional magnetic flux and disposed to direct said flux through only one sector of said core at any time, said core and said means being relatively movable, and means responsive to fluxes through and diametrically across said annular core and of the same periodicity as said voltage for producing output signals characteristic of the relative orientations of said core and flux-producing means.

4. An electrical signal transmitter comprising a flux-conducting core having an aperture therethrough, an electrical winding on said core, a source of varying amplitude voltage energizing said winding, magnetic means disposed to direct magnetic flux through only substantially one portion of said core at any time, said core and said magnetic means being relatively movable, and electrical winding means disposed to intercept fluxes across said aperture and to produce output voltages responsive to said fluxes.

5. An electrical signal transmitter comprising a substantially annular flux-conducting core, a toroidal electrical winding on said core, a source of voltage periodically varying in amplitude and energizing said winding, means producing magnetic flux and disposed to direct said flux through only substantially one portion of said core at any time, said core and said means being relatively movable, and winding means responsive to diametric fluxes across said annular core of the same periodicity as said voltage for producing electrical output signals characteristic of the relative angular orientations of said core and flux-producing means.

6. An electrical signal producing arrangement comprising a first flux-conducting core having an aperture therethrough, a first electrical winding on said core, a source of varying amplitude voltage energizing said first winding, magnetic means disposed to direct magnetic flux through said core only at substantially one portion of said core at any time, said core and magnetic means being relatively movable, a second flux-conducting core remote from said first core and having an aperture therethrough, a second electrical winding on said second core, electrical interconnections between said first and second windings at a plurality of corresponding points on said windings, and electrical winding means disposed to intercept fluxes across the aperture through said second core and to produce output voltages responsive to said fluxes.

7. An electrical pick-off arrangement comprising a substantially annular flux-conducting transmitter core, a toroidal electrical winding on said core, a source of voltage periodically varying in amplitude and energizing said winding, means disposed to direct magnetic flux through only substantially one portion of said core at any time, said core and said means being relatively rotatable, a remote substantially annular flux-conducting receiver core, a toroidal electrical winding on said receiver core, electrical interconnections between said transmitter and receiver windings at a plurality of corresponding points on said windings, and electrical winding means disposed to intercept diametric fluxes across said receiver core for producing electrical output signals characteristic of the relative angular orientations of said transmitter core and said flux-directing means.

8. A system for transmitting angular motion from one position to another position comprising, at said one position, a first relatively stationary annular flux-conducting core, a first winding on said core, a source of varying amplitude voltage energizing said first winding, and magnetic means rotatable with respect to said core and winding and disposed to direct magnetic flux through said core at only substantially one portion of said core for any angular position thereof, and, at said other position, a second relatively stationary annular flux-conducting core, a second winding on said second core, electrical winding means disposed rotatably and diametrically with respect to said second annular core, a source of varying amplitude voltage energizing said winding means, and electrical interconnections between said first and second windings at a plurality of corresponding points on said windings.

9. An angular motion reproducing arrangement comprising in combination with an angular motion input device and a remote angularly movable output device, a transmitter and a receiver each comprising a flux-conducting core having an aperture therethrough and an electrical winding on each core, the windings on said cores being electrically interconnected at a plurality of corresponding points, magnetic means rotatable with respect to said transmitter core and winding responsive to angular motion of said input device and directing magnetic flux through said transmitter core at only substantially one portion of said transmitter core for any angular orientation thereof, electrical winding means coupled with said output device and disposed rotatably with respect to said receiver core and winding and in position to be threaded by fluxes across the aperture in said receiver core, and means for energizing said windings and winding means with varying amplitude voltage.

10. An angular motion reproducing arrangement as set forth in claim 9 wherein said magnetic means comprises a permanent structure for increasing the magnetization of said one portion of said transmitter core.

11. An electrical signal producing arrangement comprising in combination with an angular motion input device and a remote angularly movable output device, a transmitter and a detector each comprising a flux-conducting core having an aperture therethrough and an electrical winding on each of said cores, the windings on said cores being electrically interconnected at a plurality of corresponding points, magnetic means rotatable with respect to said transmitter core and winding responsive to angular motion of said input device and directing magnetic flux through said transmitter core at only substantially one portion of said transmitter core for any angular orientation thereof, electrical winding means coupled with said output device for angular movement therewith and disposed to intercept fluxes across said aperture in said detector core and to produce output signals characteristic of the deviations of said input and output devices from a predetermined angular relationship, and means for energizing said core windings with varying amplitude voltage.

12. An electrical signal producing arrangement as set forth in claim 11 wherein said transmitter and detector cores are substantially annular, said electrical windings have a toroidal configuration, and said magnetic means comprises a device for producing unidirectional magnetic flux.

13. An electrical signal producing arrangement comprising in combination with an angular motion input device and a remote angularly movable output device, a flux-conducting core having an aperture therethrough, an electrical winding on said core, means for energizing said winding with varying amplitude voltage, magnetic means rotatable with respect to said core and winding responsive to angular motion of one of said devices, electrical winding means coupled with the other of said devices and arranged to have induced therein voltages which are characteristic of the fluxes established across the aperture of said core and of the deviations of said input and output devices from a predetermined angular relationship.

14. In combination, an angular motion input device, a remote angularly movable output device, a transmitter and a detector each comprising a flux-conducting core having an aperture therethrough and an electrical winding on each of said cores, said windings being electrically interconnected at a plurality of corresponding points, means energizing said windings with varying amplitude voltage, magnetic means rotatable with respect to said transmitter core and winding responsive to angular motion of said input device and directing magnetic flux through said transmitter core at only substantially one portion of said transmitter core for any angular orientation thereof, electrical winding means coupled with said output device for angular movement therewith and disposed to intercept the fluxes across said aperture in said detector core and to produce output signals characteristic of deviations of said input and output devices from a predetermined angular relationship, and means responsive to said detector output signals for angularly moving said output device to the angular position wherein said devices have said predetermined angular relationship.

HARRY C. WENDT.

REFERENCES CITED

The following references are of record in the file of this patent:

UNITED STATES PATENTS

| Number | Name | Date |
|---|---|---|
| 705,482 | Thiermann | July 22, 1902 |
| 2,342,637 | Bechberger | Feb. 29, 1944 |
| 2,421,042 | Thompson | May 27, 1947 |
| 2,465,311 | Lear | Mar. 22, 1949 |
| 2,484,569 | Jewell | Oct. 11, 1949 |